United States Patent [19]

Oguri

[11] Patent Number: 4,665,774

[45] Date of Patent: May 19, 1987

[54] HYDRAULIC CONTROL FOR AUTOMATIC TRANSMISSION WHEREIN SEQUENTIAL CLUTCH ENGAGEMENT IS CONTROLLED BY AN ACCUMULATOR

[75] Inventor: Kazuo Oguri, Hiroshima, Japan

[73] Assignee: Mazda Motor Corporation, Hiroshima, Japan

[21] Appl. No.: 746,071

[22] Filed: Jun. 18, 1985

[30] Foreign Application Priority Data

Jun. 20, 1984 [JP] Japan ................................ 59-128026

[51] Int. Cl.$^4$ ............................................. B60K 41/06
[52] U.S. Cl. .................................. 74/868; 74/752 C; 192/48.7
[58] Field of Search ............. 74/869, 868, 867, 752 C, 74/688; 192/48.7, 87.11, 87.13

[56] References Cited

U.S. PATENT DOCUMENTS

| 3,300,004 | 1/1967 | Peterson | 192/87.11 X |
| 3,908,485 | 9/1975 | Miyauchi et al. | 74/869 X |
| 4,224,837 | 9/1980 | Croswhite | 74/688 |
| 4,225,029 | 9/1980 | Ushijima | 192/12 C |
| 4,250,985 | 2/1981 | Clements | 192/48.7 |
| 4,289,044 | 9/1981 | Dorpmund et al. | 74/688 |
| 4,325,271 | 4/1982 | Iwanaga et al. | 74/869 |
| 4,331,044 | 5/1982 | Bookout | 74/688 |
| 4,422,353 | 12/1983 | Suga et al. | 74/869 X |
| 4,427,101 | 1/1984 | Mancher et al. | 192/48.7 |
| 4,462,278 | 7/1984 | Murakami et al. | 74/752 C X |
| 4,531,433 | 7/1985 | Suga | 74/869 |

FOREIGN PATENT DOCUMENTS

| 44159 | 3/1980 | Japan | 74/869 |
| 2029525 | 3/1981 | United Kingdom | 74/869 |

OTHER PUBLICATIONS

"Industrial Hydraulic Technology", Bulletin 0221-B1, Parker, Chapter 9, 11/1973.

Primary Examiner—Lawrence Staab
Assistant Examiner—Dwight G. Diehl
Attorney, Agent, or Firm—Watson, Cole, Grindle & Watson

[57] ABSTRACT

A hydraulic control for an automatic transmission which comprises first and second friction coupling members, a first fluid passage for supplying an operating fluid for coupling the first friction coupling member, a second fluid passage for supplying an operating fluid for coupling the second friction coupling member, and an accumulator having a working chamber fluid-connected with the first fluid passage and comprising a piston and a spring for urging the piston in one direction. The piston is displaced against the spring, when the operating fluid is supplied into the working chamber, to regulate the pressure of the operating fluid for minimizing a shock resulting from the coupling of the first friction coupling members and also to open the second fluid pssage whereby the timing at which the second friction coupling member is coupled is delayed relative to the timing at which the first friction coupling member is coupled.

9 Claims, 3 Drawing Figures

HYDRAULIC CONTROL FOR AUTOMATIC TRANSMISSION WHEREIN SEQUENTIAL CLUTCH ENGAGEMENT IS CONTROLLED BY AN ACCUMULATOR

BACKGROUND OF THE INVENTION

The present invention generally relates to an automatic transmission in an automotive vehicle and, more particularly, to a hydraulic control for controlling the coupling timings of two friction coupling members, for example, a forward clutch and a coasting clutch, employed in the automatic transmission.

In the prior art automatic transmission, the forward clutch is generally fabricated to have a relatively great capacity because it is coupled during any one of the forward run and the drive whereas the coasting clutch is fabricated to have a relatively small capacity because it serves to transmit a torque in place of the forward clutch during the non-drive such as, for example, during the engine braking.

Since the coasting clutch is of small capacity as described above, it has a problem in that, a high load dash while it has been coupled at a timing earlier than the forward clutch, the high load tends to be imposed on the coasting clutch to such an extent as many result in the detrimental overheating of the coasting clutch. The relationship in coupling timing between the forward clutch and the coasting clutch is such that the coasting clutch must be coupled a predetermined delay time after the forward clutch has been coupled.

Hitherto, such a timing control has been carried out by the use of two orifices of different size. The timing control by the use of the orifices of different size has been, however, found disadvantageous in that an accurate operation can hardly be achieved. Therefore, it has been proposed to provide the control with an extra timing valve (delay valve) for enabling the clutches to be coupled at different timings such as disclosed in, for example, U.S. Pat. No. 4,225,829.

However, the use of the extra timing valve has a problem in that, not only is the cost increased correspondingly, but also no delicate adjustment in interrelationship between the forward and coasting clutches can be achieved at the time of coupling.

SUMMARY OF THE INVENTION

The present invention has for its essential object to provide a hydraulic control for an automatic transmission wherein an accumulator for regulating an operating pressure is employed, instead of the use of the extra timing valve, to provide a delay between the coupling timings of respective friction coupling members so that the coupling timing of one of the friction coupling members can with no fault be delayed relative to that of the other of the friction coupling members.

According to the present invention, and referring to FIG. 1 of the accompanying drawings, there is utilized an accumulator 202 having a working chamber 201 communicated with a first fluid passage 200 for the supply of an operating pressure to one of the two friction coupling members, for example, a first friction coupling member X. This accumulator 202 is such a construction that, when the operating pressure is supplied to the first fluid passage 200, this operating pressure can be temporarily introduced into the working chamber 201 to permit a piston 203 to be displaced against the force of a built-in spring 204 thereby to relieve a rapid increase of the operating pressure acting on the first friction coupling member X and that, when the piston 203 so displaced has moved a distance greater than a predetermined value, a second fluid passage 205 for the supply of an operating pressure to the other of the friction coupling members, that is, a second friction coupling member Y can be opened to permit the second friction coupling member Y to be coupled.

Thus, in the present invention, the increase of the operating pressure acting on the first friction coupling member X can be relieved by the accumulator 202 to minimize the coupling shock and, at the same time, at the time the first friction coupling member X has been completely coupled from a substantially half-coupled position, as a result of the sufficient increase of the operating pressure, that is, when the piston 203 has travelled its full stroke against the spring 204, the second fluid passage 205 then closed is opened to bring the second friction coupling member Y into a coupling position. As such, the piston operates as a switching member.

In the practice of the present invention, a combination of the friction coupling members X and Y may be either a combination of the forward and costing clutches referred to hereinbefore, or a combination of 3-4 shift clutch and a lock-up clutch or any other combination of clutches which require the coupling timings to differ from each other.

It is to be noted that, in FIG. 1, reference character P represents an oil pump, reference numeral 206 represents a manually operated valve for shift operation purpose, and reference numerals 207 and 208 represent respective check valves disposed on pressure supply passages leading to the associated first and second friction coupling members X and Y. It is also to be noted that a lower half (a) of the accumulator 202 is shown as the accumulator 202 assuming an inoperative position whereas an upper half (b) of the same is shown as the accumulator 202 assuming an operated position.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
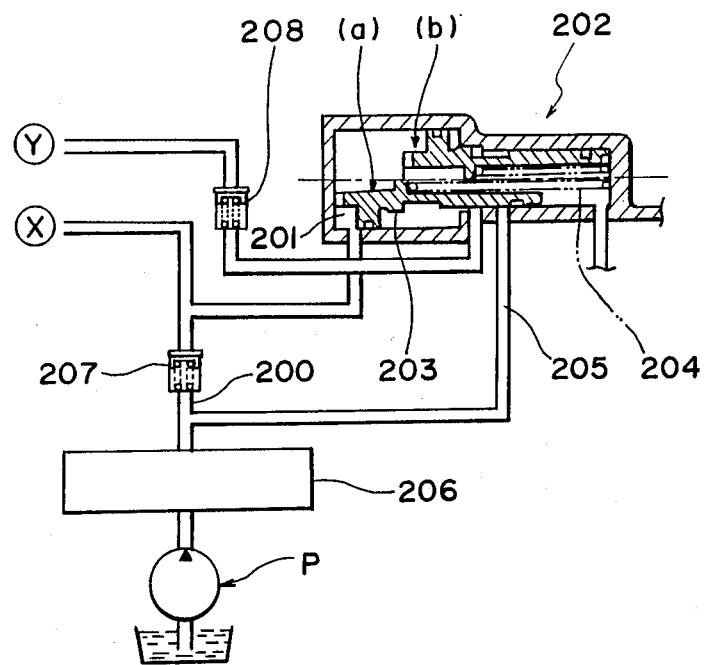
FIG. 1 is a schematic sectional view showing the principle of the present invention.

Before the description of the preferred embodiment of the present invention proceeds, it is to be noted that like parts are designated by like reference numerals throughout the accompanying drawings.

Figure 2:
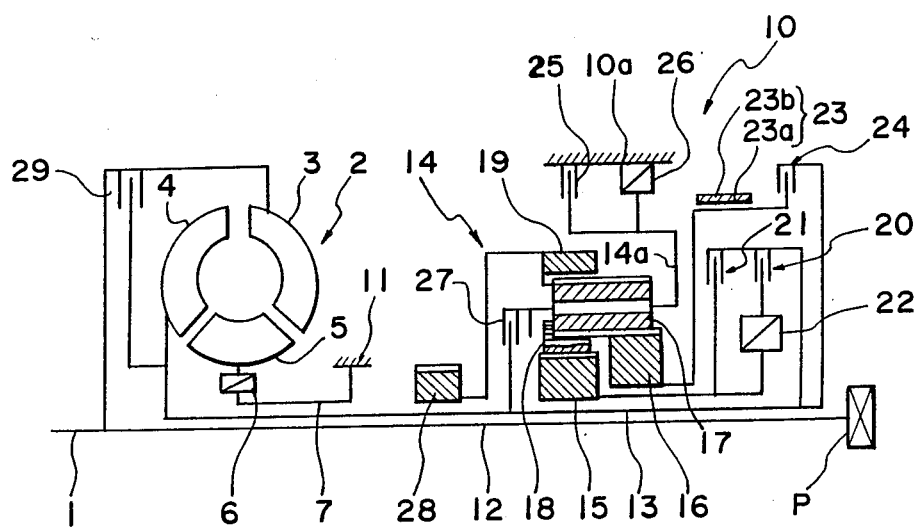
FIG. 2 is a skeleton diagram showing an automatic transmission.

Referring now to FIG. 2 which illustrates a skeleton of the automatic transmission embodying the present invention, the transmission shown therein has an input shaft 1 coupled with a crankshaft of an automobile engine (not shown) for rotation together therewith, a torque converter 2 coaxially mounted on the input shaft 1, and a multistage speed-change gearing 10 disposed on one side of the torque converter 2 remote from the engine. The torque converter 2 comprises a pump 3, a turbine 4 and a stator 5, the pump 3 being fixed on the input shaft 1. The stator 5 is rotatable around a fixed shaft 7, which is integral with a casing 11 for a speed-change gearing 10, through a unidirectional clutch 6 of such a design capable of permitting the stator 5 to be rotated in the same direction as the direction of rotation of the pump 3, but not permitting the stator 5 to rotate in a direction counter to the direction of rotation of the pump 3.

The speed-change gearing 10 includes a main shaft 12 having one end rigidly connected with the input shaft 1 for rotation together therewith and the other end drivingly coupled with the oil pump P secured to a side wall of the gearing 10 for driving the oil pump P, a substantially intermediate portion of the main shaft 12 extending centrally through the gearing 10. Exteriorly of the main shaft 10 is disposed a quill shaft 13 having one end coupled with the turbine 4 of the torque converter 2 and the other end rotatably supported by the side wall of the gearing 10. The quill shaft 13 has a Ravignawx type planetary gear unit 14 mounted therearound. The planetary gear unit 14 comprising a reduced diameter sun gear 15, a large diameter sun gear 16 arranged on one side of the reduced diameter sun gear 15 remote from the engine, a long pinion gear 17, a short pinion gear 18 and a ring gear 19. On one side of the gear unit 14 remote from the engine, there is arranged a forward clutch 20 and a coasting clutch 21 in parallel to each other. The forward clutch 20 is operable to selectively couple and decouple the reduced diameter sun gear 15 with and from the quill shaft 13 through the unidirectional clutch 22, respectively, whereas the coasting clutch 21 is operable to selectively couple and decouple the reduced diameter sun gear 15 with and from the quill shaft 13 in parallel with the forward clutch 20.

A first brake 23 is disposed radially outwardly of the coasting clutch 21. This first brake 23 is a hand operated brake and includes a brake drum 23a connected with the large diameter sun gear 16, and a braking band 23b turned around the brake drum 23a. Radially outwardly of the forward clutch 20 and laterally of the first brake 23 is disposed a third clutch 24 operable to selectively couple and decouple the large diameter sun gear 16 with and from the quill shaft 13 through the brake drum 23a of the first brake 23.

A second brake 25 operable to selectively engage and disengage a carrier 14a of the gear unit 14 with and from the casing 10a of the speed-change gearing 10 is arranged radially outwardly of the gear unit 14. A second unidirectional clutch 26 is arranged between the first and second brakes 23 and 25 and in parallel to the second brake 25 for selectively engaging and disengaging the carrier 14a with and from the casing 10a. On one side of the gear unit 14 adjacent the engine, a fourth clutch 27 is arranged, which clutch 27 is operable to selectively couple and decouple the carrier 14a with and from the quill shaft 13. On one side of the fourth clutch 27 adjacent the engine is arranged an output gear 28 connected with the ring gear 19. Reference numeral 29 represents a lock-up clutch operable to couple the input shaft 1 direct with the quill shaft 13.

A hydraulic control circuit including the forward and coasting clutches 20 and 21 will now be described with particular reference to FIG. 3.

Figure 3:
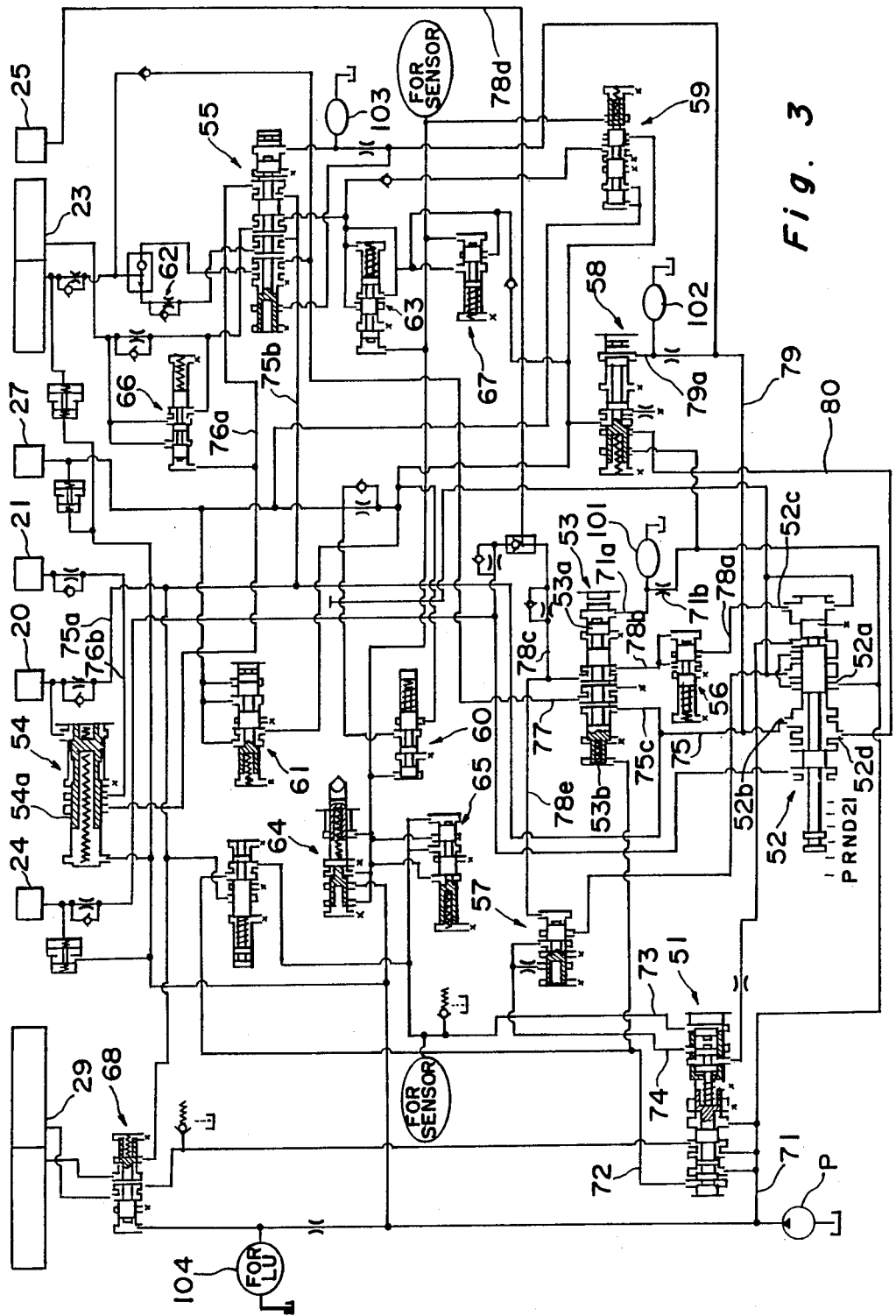
FIG. 3 is a hydraulic circuit showing a hydraulic control embodying the present invention.

As shown in FIG. 3, an operating fluid discharged onto a pressure line 71 from the oil pump P driven by the engine has its pressure regulated to a predetermined line pressure ($P_L$) by a regulator valve 51 operated by a throttle pressure ($P_S$) fed from a line 72, a throttle modulator pressure ($P_{SM}$) fed from a line 73 and a back-up pressure ($P_B$) fed from a line 74, which line pressure ($P_L$) is in turn supplied through a line 71 to a port 52a of a manually operated valve 52. The manually operated valve 52 is in practice operatively associated with an operating lever disposed in a driver's seat and can be shifted to any one of P-, R-, N-, D-, 2- and 1-range positions according to the manipulation of the operating lever so that the hydraulic pressure supplied to the port 52a can be supplied to any other port or ports of the manually operated valve 52.

The line pressure ($P_L$) also acts on a right-hand end of a 1-2 shift valve 53 through the line 71 and then through a line 71a communicated with the line 71 through an orifice 71b. The line 71a is also communicated with a drain through a solenoid 101 for 1-2 shift purpose. Specifically, when the solenoid 101 is energized, the line 71a can be communicated with the drain, but when it is deenergized, the communciation between the line 71a and the drain can be interrupted, wherefor a spool 53a of the 1-2 shift valve 53 receives both a biasing force of a spring 53b from the left and the pressure on the line 71a is moved rightwards to establish a 2-speed condition when the solenoid 101 is energized or leftwards to establish a 1-speed condition when the solenoid 101 is deenergized. Since at the D-range position the line pressure ($P_L$) is supplied from a port 52b of the manually operated valve 52 to a line 75, at the 1-speed condition of the D-range position the line pressure ($P_L$) is supplied through a line 75a to the forward clutch 20 and, at the same time, causes an accumulator 54 to displace leftwards to establish a communication between lines 76a and 76b so that the line pressure ($P_L$) can be supplied to the coasting clutch 21 through lines 75b, 76a and 76b. When while in the D-range position the solenoid 101 is energized to establish the 2-speed condition, a line 75c branched from the line 75 in communication with the port 52b of the valve 52 is communicated with a line 77 with the line pressure ($P_L$) consequently supplied to a coupling side of a 2-4 brake 23 through a 3-4 shift valve 55. At a 1-speed condition of the 1-range position, the line pressure which has emerged onto a line 78a communicated with a port 52c of the valve 52 and which has subsequently been reduced to a line pressure ($P_L'$) through a Low reducing valve 56 is supplied to an L and R brake 25 through lines 78b to 78d and also as a signal pressure to a throttle back-up valve 57 through a line 78e.

A 2-3 shift valve 58 is applied with the line pressure ($P_L$) from the port 52b of the valve 52, which line pressure ($P_L$) acts on a right end of the valve 58 through lines 79 and 79a, the line 79a being communicated with the drain wen a solenoid 102 for 2-3 shift purpose is energized, but incommunicated therefrom when it is deenergized. Because of this, the 2-speed condition and the 3-speed condition can be established when the solenoid 102 is energized and deenergized, respectively. Therefore, when the speed changes from the 2-speed condition to the 3-speed condition, the line pressure ($P_L$) supplied from a port 52d of the valve 52 to a line 80 is supplied through a servocontrol valve 59, a 2-3 timing valve 60 and a bypass valve 61 ultimately to a 3-4 clutch 27 to operate the latter and also to a release side of the 2-3 brake 23 to release the latter.

Even in the 3-4 shift valve 55, the line pressure ($P_L$) supplied from the port 52b of the valve 52 and acting on a right-hand end of the valve is so controlled by a solenoid 103 that, when the solenoid 103 is energized, a 4-speed condition can be established, but when it is deenergized, the 3-speed condition can be established. At the 3-speed condition, the line pressure ($P_L$) fed from the line 75c through the 1-2 shift valve 53 is supplied to the coupling side of the 2-4 brake 23 and, at the same time, the line pressure ($P_L$) fed from the port 52a of the valve 52 and by passing the 1-2 shift valve 53 is supplied to the coupling clutch 21 through the 3-4 shift valve 55 and the accumulator 54. When the 3-speed condition is changed over to the 4-speed condition by energizing the solenoid 103, the line pressure ($P_L$) fed through the 1-2 shift valve 53 is supplied to the coupling side of the 2-4 brake 23 through a circuit 62 having an orifice and a check valve. At this time, a hydraulic pressure in a release side of the 2-4 brake 23 is drained through a 3-4 capacity valve 63 and a hydraulic pressure in the coasting clutch 21 is also drained.

Once the range is fixed by the manually operated valve 52, by controlling the switching on and off of each of the solenoid 102 for 2-3 shift purpose and the solenoid 103 for 3-4 shift purpose, the respective shift valve can be activated to effect a particular speed change.

The Low reducing valve 56 is operable to reduce the line pressure ($P_L$) so that the hydraulic pressure in the L-R brake 25 can be reduced to lessen the shock occurring at the time of speed change and, at the same time, the signal pressure can be supplied to the throttle back-up valve 57. The throttle back-up valve 57 controls the supply of hydraulic pressure to the regulator valve 51 in dependence on the presence or absence of the signal pressure thereby to control the line pressure ($P_L$) for securing a capacity for the engine braking. Both the throttle valve 64 and the throttle modulator valve 65 are a valve for deriving a hydraulic pressure proportional to the accelerator opening, which hydraulic pressure renders the line ($P_L$) to match with the engine torque. A 2-3 timing valve 60, the servo-control valve 59 and a bypass valve 61 are used to minimize the delay in response during the speed change from the 2-speed condition to the 3-speed condition thereby to minimize the shock occurring at the time of speed change. A 3-4 capacity valve 66 is used to minimize the shock occurring at the time of speed change from the 3-speed condition onto the 4-speed condition, whereas both the 3-2 capacity valve 63 and a 3-2 timing valve 67 are a valve used to minimize the shock occurring at the time of speed change from the 3-speed condition onto the 2-speed condition according to the throttle opening. The accumulator 54 to which the present invention pertains performs an accumulating action for the time when the manually operated valve 52 is operated to shift from N-range to D-range and, at this time, the movement of an accumulator piston 54a is utilized to delay the timing at which the operating fluid is supplied to the coasting clutch 21, relative to the timing at which the operating fluid is supplied to the forward clutch 20, for the purpose of avoiding any possible abnormal wear of the coasting clutch which would occur at the time of change from the N-range to the D-range while the accelerator is depressed. A lock-up control valve 68 controls the operation of the lock-up clutch 29 in dependence on the switching on and off of a solenoid 104 for lock-up purpose.

Accordingly, the timing at which the coasting clutch 21 is coupled can be fixed after the forward clutch 20 has been completely coupled from its half-coupled position, and therefore, the coasting clutch 21 can be coupled a predetermined delay time subsequent to the coupling of the forward clutch 20.

As hereinbefore described, since the present invention is such that, by the employment of the construction feature wherein the second fluid passage comprised of the lines 76a and 76b for the supply of the operating fluid to the coasting clutch 21 can be selectively closed and opened by the utilization of the accumulator 54 provided for minimizing the shock caused by the forward clutch 20 at the time of speed change, the coasting clutch 21 can be coupled subsequent to the coupling of the forward clutch 20.

Although the present invention has been described in connection with the preferred embodiment thereof with reference to the accompanying drawings, it is to be noted that various changes and modifications are apparent to those skilled in the art. By way of example, a 3-4 shift clutch 27 to be coupled at the time of shift from the 3-speed condition to the 4-speed condition and the lock-up clutch 29 to be coupled subsequent to the coupling of the 3-4 shift clutch 27 may supersede the forward and coasting clutches. In any event, the concept of the present invention is applicable where the two friction coupling members are desired to be coupled at different timings.

Accordingly, such changes and modifications are to be understood as included within the scope of the present invention as defined by the appended claims unless they depart therefrom.

What is claimed is:

1. A hydraulic control for an automatic transmission which comprises, in combination:
   a source of operating fluid;
   at least first and second friction coupling members which are each capable of assuming one of released and coupled positions at a time;
   a valving means interposed between the operating fluid source and both of the first and second friction coupling members and operable to selectively interrupt and effectuate the supply of the operating fluid from the operating fluid source to both of the first and second friction coupling members;
   a first fluid passage for supplying the operating fluid to one of the friction coupling members for causing said one of the first and second friction coupling members to assume the coupled position;
   a second fluid passage for supplying the operating fluid to the other of the first and second friction coupling members for causing said other of the first and second friction coupling members to assume the coupled position; and
   an accumulator having a working chamber fluid-connected with the first fluid passage, said accumulator comprising a piston and a spring for urging the piston in one direction, said piston comprising a switching member which controls the supply of operating fluid to said second fluid passage, said switching member being operable to establish the second fluid passage when the operating fluid supplied into the working chamber attains a predetermined value required to displace the piston against the spring to regulate the pressure of the operating fluid for minimizing a shock which would result when said one of the first and second friction coupling members is brought into the coupled position, said switching member being also operable to close the second fluid passage when and so long as the pressure of the operating fluid supplied into the working chamber is lower than the predetermined value, whereby the timing at which said other of the first and second friction coupling members is brought into the coupled position is delayed relative to the timing at which said one of the first and second friction coupling members is brought into the coupled position.

2. The control as claimed in claim 1, wherein said one of the friction coupling members has a greater capacity than said other of the friction coupling members.

3. The control as claimed in claim 1, wherein said operating fluid source is a pump and said valving means is a manually operated valve for shift maneuver, said valving means having an input passage means fluid-connected with the pump and an output passage means, and wherein the first and second fluid passages are branched from the output passage means.

4. The control as claimed in claim 3, wherein the first fluid passage connects the manually operated valve with said one of the friction coupling members and said second fluid passage connects the manually operated valve with said other of the friction coupling members, the selective interruption and effectuation of the supply of the operating fluid to said other of the friction coupling members through the second fluid passage being controlled by the accumulator.

5. The control as claimed in claim 1, wherein the friction coupling means are arranged in a power transmission system of the automatic transmission in parallel relation to each other.

6. The control as claimed in claim 5, wherein said operating fluid source is a pump and said valving means is a manually operated valve for shift maneuver having a forward drive port to which both of said first and second fluid passages are fluid-connected, wherein one of the friction coupling members is a forward clutch having a great capacity and adapted to receive the operating fluid direct through the first fluid passage, and wherein said other of the friction coupling members is a coasting clutch of small capacity and adapted to receive the operating fluid by way of the accumulator through the second fluid passage.

7. The control as claimed in claim 5, wherein said one of the friction coupling members is a forward clutch and said other of the friction coupling members is a coasting clutch.

8. The control as claimed in claim 7, wherein the forward clutch is a clutch disposed in a forward drive torque transmission system of the transmission, wherein a one-way clutch is operatively connected in series with said forward clutch, and wherein said coasting clutch is operatively connected in parallel with said one-way clutch and said forward clutch.

9. The control as claimed in claim 1, wherein said switching member is constituted by an integral part of said piston.

* * * * *